United States Patent
Sambur et al.

(10) Patent No.: US 9,576,081 B2
(45) Date of Patent: Feb. 21, 2017

(54) PRESSURIZED WATER DISTRIBUTION NETWORK MANAGEMENT

(71) Applicant: International Business Machines Corporation, Armonk, NY (US)

(72) Inventors: Michael Sambur, Haifa (IL); Alexey Tsitkin, Petah Tikva (IL); Segev Wasserkrug, Haifa (IL); Alexander Zadorojniy, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 478 days.

(21) Appl. No.: 13/905,151

(22) Filed: May 30, 2013

(65) Prior Publication Data

US 2014/0358499 A1    Dec. 4, 2014

(51) Int. Cl.
*G06F 17/50* (2006.01)
*E03B 1/02* (2006.01)

(52) U.S. Cl.
CPC ............ *G06F 17/5009* (2013.01); *E03B 1/02* (2013.01); *G06F 17/509* (2013.01); *G06F 2217/16* (2013.01); *G06F 2217/34* (2013.01)

(58) Field of Classification Search
CPC ...... E03B 1/02; G06F 17/5009; G06F 17/509; G06F 2217/16; G06F 2217/34
USPC ............................................................ 703/2
See application file for complete search history.

(56) References Cited

U.S. PATENT DOCUMENTS

| 7,542,885 B1 * | 6/2009 | Majumdar .......... G06F 17/5018 700/83 |
| 2014/0052421 A1 * | 2/2014 | Allen et al. ...................... 703/2 |
| 2014/0324398 A1 * | 10/2014 | Gullapalli .......... G06F 17/5036 703/2 |

FOREIGN PATENT DOCUMENTS

TW        201128428    *    8/2011    ............. G06F 17/50

OTHER PUBLICATIONS

Danna, E., Integrating Mixed Integer Programming and Local Search: A Case Study on Job-Shop Scheduling Problems, Proceedings CPAIOR'03.*
Costa, A.L.H., Optimization of Pipe Networks Including Pumps by Simulated Annealing, Braz. J. Chem. Eng. vol. 17 n. 4-7 Sao Paulo Dec. 2000 http://dx.doi.org/10.1590/s0104-66322000000400053.*

(Continued)

*Primary Examiner* — Aniss Chad
*Assistant Examiner* — Scott S Cook

(57) ABSTRACT

A computerized method for scalable management optimization of pressurized water distribution networks, comprises receiving a network model representing a pressurized water distribution physical network having water flow variables. The network model is simulated by solving non-linear mathematical equations representing the behavior of the water flow variables. One or more result sets are fed to the non-linear mathematical equations. The non-linear mathematical equations are linearized. Network model optimization requirements are received from a user. The linearized mathematical equations are optimized according to the received network model optimization requirements. A local search starting from the at least one optimized solution is performed using the non-linearized mathematical equations, thereby generating a solution.

20 Claims, 4 Drawing Sheets

(56) References Cited

OTHER PUBLICATIONS

Grotschel, M., Nonconvex Mixed-Integer Nonlinear Programming, DFG Research Center Matheon, Mathematics for key technologies, Application Area B, Project B19, Apr. 30, 2009 http://www.math.hu-berlin.de/~stefan/B19/.*
Genova (Linear Integer Programming Methods and Approaches—A survey, Cybernetics and Information Technologies, vol. 11, No. 1, Sofia, 2011).*
Sterling (Leakage Reduction by Optimized Control of Values in Water Networks, Trans Inst M C vol. 6, No. 6, Oct.-Dec. 1984).*
Raidl (Combining (Integer) Linear Programming Techniques and Metaheuristics for Combinatorial Optimization, Studies in Computational Intelligence (SCI) 114, 31-62 (2008)).*
Wasserkrug (Relieving Pressure: Optimizing Water Distribution Pressure Management at Valley of the Moon Water District, 2013 INFORMS Annual Meeting—Daniel H. Wagner Prize for Excellence in Operations Research Practice).*
Sacharen (Smart Water Analytics—When It Meets H2O: First of a Kind project uses smart analytics to cut water loss in Sonoma County, dated Mar. 7, 2012, posted online http://ibmresearchnews.blogspot.com/2012/03/smart-water-analytics-when-it-meets-h2o.ht . . . ).*
NewScientist, Oct. 9, 1980 vol. 88 No. 1222 Weekly 50p.*
Zabinsky, Z.B., Random Search Algorithms, Apr. 5, 2009 Department of Industrial and Systems Engineering, University of Washington, Seattle, WA.*
Urroz, (Solution of Non-linear Equations, Sep. 2004).*
Gardi_2011 (Local Search for Mixed-Integer Nonlinear Optimization: A Methodology and an Application, EvoCOP 2011, LNCS 6622, pp. 167-178, 2011).*
Schoen_2001 (Two-Phase Methods for Global Optimization, Chapter 5, Handbook of Global Optimization vol. 2, 2002).*
Gouveia et al., "An Improved Decomposition-Based Heuristic to Design a Water Distribution Network for an Irrigation System", Annals of Operations Research, Dec. 2011.
Eck et al., "Valve Placement in Water Networks: Mixed-Integer Non-Linear Optimization with Quadratic Pipe Friction", IBM Research, Smarter Cities Technology Center, Sep. 2012.
Sherali et al., "A Global Optimization Approach to a Water Distribution Network Design Problem, Journal of Global Optimization", Journal of Global Optimization, vol. 11, Issue 2, pp. 107-132, Sep. 1997.
Sterling et al.,"Leakage Reduction by Optimized Control of Valves in Water Networks", Transactions of the Institute of Measurement and Control, vol. 6, No. 6, pp. 293-298, Oct. 1984.

* cited by examiner

Table 400

| Network 410 | # Pipes 420 | # Valves 430 | # Hours 440 | Computation time (seconds) NLP 450 | Linear 460 | Objective value (seconds) NLP 470 | Linear 480 |
|---|---|---|---|---|---|---|---|
| SB25 411 | 36 421 | 3 431 | 1 441 | 1 451 | 1 461 | 576 471 | 568 481 |
| SB25 412 | 36 422 | 3 432 | 24 442 | 78 452 | 15 462 | 13991 472 | 13991 482 |
| Net1 413 | 128 423 | 3 433 | 1 443 | 1 453 | 1 463 | 2272 473 | 2272 483 |
| ExNet 414 | 2456 424 | 3 434 | 1 444 | 200 454 | 8 464 | 63907 474 | 63104 484 |
| Net2 415 | 789 425 | 10 435 | 1 445 | 632 455 | 54 465 | 41579 475 | 41684 485 |

FIG. 4

PRESSURIZED WATER DISTRIBUTION NETWORK MANAGEMENT

BACKGROUND

The present invention, in some embodiments thereof, relates to methods and systems for managing networks and, more specifically, but not exclusively, to methods and systems for approximating solutions for optimized management of a liquid distribution networks such as a pressurized water distribution network.

Water distribution networks are complex entities, composed of many types of components, such as pipes, valves, pumps, and tanks, making their efficient management a significant challenge. The growing worldwide demand for water as well as increasing urbanization renders a growing complexity of water distribution networks. Managing large complex water distribution networks requires coping with water distribution network matters such as: water stagnation management, demand prediction, supply to end consumers according to predefined requirements (pressure, cost, quantity and quality), reduction of Non-Revenue Water (NRW) etc.

One of the most significant matters in water distribution network management, in terms of cost and environmental impact, is reducing Non-Revenue Water (NRW). NRW is water that is input into the network but is not paid for or generating revenue. NRW includes water lost due to leaks, bursts and theft as well as water retention in tanks. According to the Environmental Protection Agency, much of the 880,000 miles of water pipes in the United States has been in service for decades—some for over 100 years—and can be significant source of water loss. The World Bank estimates that worldwide costs from leaks total 14 billion United States Dollars annually.

Reducing the water pressure in the network is a well-known recommended practice for reducing NRW. The higher the pressure in the network, the larger the amount of water lost in leaks and bursts. Consequently, lowering the pressure in the water network has the potential to significantly reduce water loss. However, there are additional, often conflicting, goals associated with pressure management: 1) Water supply pressure—A high enough pressure level must be maintained to ensure that water reaches all consumers at the required flow rates. 2) Water turnover—Water pressure has a direct influence on water turnover—the length of time during which water remains in tanks. A higher water pressure causes water to remain in tanks for longer periods, which might lead to quality issues due to water stagnation or the decay of disinfectants like chlorine. In addition to these conflicting goals, there are several other factors that contribute to the challenge of water pressure management: i) The pressure in the system is highly dependent on the demand for water. However, such demand varies both during the day and across seasons. ii) In highly connected networks, changing one valve or pump or tank setting in order to adjust pressure in one part of the system may actually have a detrimental impact on the pressure in another part of the system.

Managing a pressurized water distribution system is a challenging task. Solution approximation is often sought by engineers based on intimate familiarity and experience with a particular water distribution network. This type of intuition-based strategy is error prone and often results in sub optimal management. Often solutions achieved by formal computerized methods surplus intuition-based strategies in performance. Current computerized methods for approximating a solution aim to find feasible solutions utilizing strategies such as: Linear programming, non-linear programming, evolution based heuristics and mixed integer nonlinear programming.

Liner programming is often applied to complex networks, such as a pressurized water distribution network, in its mixed integer specimen: mixed integer linear programming (MILP). However, pressurized water distribution networks are not linear in nature. Pressurized water distribution network aspects such as head loss formulas and pumps discharge equations are not linear (Methods, H., Walski, T., Chase, D., Savic, D., Grayman, W., Beckwith, S., Koelle, E., 2003, "Advanced water distribution modeling and management", Bentley Institute Press). In order to apply MILP to pressurized water distribution network, the problem is linearized. The linearization is performed in a manner assuring a high quality solution can be found within a reasonable running time. Linearization is performed, for example by the piece-wise linearization technique (Bertsimas, D., Tsitsiklis, J. N, 1997, "Introduction to linear optimization", Athena Scientific Belmont). Piece-wise linearization covers by small enough linear pieces a non-linear curve when a solver chooses only one of them as a solution. A drawback of this technique is long running times for real scale problems (Eck, B., Mevissen M., "Valve Placement in Water Networks: Mixed-Integer Non-Linear Optimization with Quadratic Pipe Friction", IBM Research Report). Another linearization technique is based on the first order Taylor series approximation (Sherali D., Smith, E., 1997, "A Global Optimization Approach to a Water Distribution Network Design Problem, Journal of Global Optimization", 11(2), 107-132). Although first order Taylor series approximation technique by itself is faster than piece-wise linearization technique, it is unlikely to be applied to large scale problems such as real cities pressurized water distribution networks due to related long running time and inferior solution quality. Another linear programming method is a sequential linear programming (Sterling, M., Bargiela, A., 1984, "Leakage Reduction by Optimized Control of Valves in Water Networks", Transactions of the Institute of Measurement and Control, 6(6), 293-298). Sequential linear programming starts with an initial guess of the solution (decision variables). Then, it is iteratively solves the problem, updating the solution at each iteration and using the current iteration solution for developing first order Taylor series for the next one. In each iteration, a linear program which represents a whole network must be solved. As multiple iterations are required, overall running times are expected to be unfeasible for large scale problems such as pressurized water distribution networks. Moreover, the solution quality of sequential linear programming is compromised by approximation and integer variables handling.

SUMMARY

According to an aspect of some embodiments of the present invention there is provided a computerized method for scalable management optimization of pressurized water distribution networks, comprising: receiving a network model representing a pressurized water distribution physical network, said network model having a plurality of water flow variables; simulating said network model by solving a plurality of non-linear mathematical equations representing the behavior of said plurality of water flow variables, thereby generating at least one result set comprising at least one result value for each of said plurality of water flow variables; feeding said at least one result set to said plurality of non-linear mathematical equations; linearizing said plurality of non-linear mathematical equations; receiving a plurality of network model optimization requirements from a user; optimizing linarized said plurality of mathematical equations according to received said plurality of network model optimization requirements, thereby generating at least one optimized linearized solution for linearized said plurality of mathematical equations; performing a local search starting from said at least one optimized solution using linearized said plurality of mathematical equations, thereby generating at least one non-linearized solution.

Optionally, linearizing said plurality of linear equations is performed by a first order Taylor series. Optionally, linearizing said plurality of non-linear mathematical equations utilizes said at least one result set. Optionally, at least one of said receiving a network model, said simulating, said feeding, said linearizing, said receiving a plurality of network models, said optimizing and said performing a local search is iteratively repeated. Optionally, the method further comprises: receiving an objective function evaluating said network model; assessing said at least one optimized linearized solution by said objective function; and assessing said at least one optimized non-linearized solution by said objective function; wherein assessed said at least one optimized solution is bigger than assessed said at least one optimized linearized solution. Optionally, the objective function comprises said plurality of network model optimization requirements. Optionally, said local search is stopped before said at least one optimized solution is achieved.

According to an aspect of some embodiments of the present invention there is provided a computerized method for scalable management optimization of pressurized water distribution networks, comprising: a computer readable storage medium; first program instructions to receive a network model representing a pressurized water distribution physical network, said network model having a plurality of water flow variables; second program instructions to simulate said network model by applying a plurality of mathematical equations representing the behavior of said plurality of water flow variables, thereby generating at least one result set comprising at least one result value for each of said plurality of water flow variables; third program instructions to feed said at least one result set to said plurality of mathematical equations; fourth program instructions to linearize said plurality of mathematical equations; fifth program instructions to receive a plurality of network model optimization requirements from a user; sixth program instructions to optimize linearized said plurality of mathematical equations according to received said plurality of network model optimization requirements, thereby generating at least one optimized solution for linearized said plurality of mathematical equations; seventh program instructions to perform a local search starting from said at least one optimized solution of linearized said plurality of mathematical equations, thereby generating at least one optimized solution; wherein said first, second, third, fourth, fifth, sixth and seventh program instructions are stored on said computer readable storage medium.

Optionally, the plurality of mathematical equations is a plurality of non-linear mathematical equations and said linearizing is performed by turning said plurality of non-linear equations into a plurality of linear equations and solving said plurality of linear equations by a first order Taylor series.

According to an aspect of some embodiments of the present invention there is provided a system for scalable management optimization of pressurized water distribution networks, comprising: a computerized processor; an input module which receives a network model representing a pressurized water distribution physical network, said network model having a plurality of water flow variables and receives a plurality of network model optimization requirements from a user; a simulation module which simulates, using said, said network model by applying a plurality of mathematical equations representing the behavior of said plurality of water flow variables, thereby generating at least one result set comprising at least one result value for each of said plurality of water flow variables and feeds said at least one result set to said plurality of mathematical equations; an optimization module which generates a linearized mathematical programming model using said plurality of mathematical equations and optimizes linearized said plurality of mathematical equations according to received said plurality of network model optimization requirements, thereby generating at least one optimized solution for linearized said plurality of mathematical equations; a search module which performs a local search starting from said at least one optimized solution of linearized model using said plurality of mathematical equations, thereby generating at least one optimized solution.

Optionally, said plurality of mathematical equations is a plurality of non-linear mathematical equations and said linearizing is performed by turning said plurality of non-linear equations into a plurality of linear equations using first order Taylor series.

According to an aspect of some embodiments of the present invention there is provided a computerized method for scalable management optimization of graph networks, comprising: receiving a network model having a plurality of vertices connected by a plurality of edges and a plurality of variables represent properties of at least one of said plurality of vertices and said plurality of edges; simulating said network model by applying a plurality of mathematical equations representing the behavior of said plurality of variables, thereby generating at least one result set comprising at least one result value for each of said plurality of variables; feeding said at least one result set to said plurality of mathematical equations; linearizing said plurality of mathematical equations; receiving a plurality of network model optimization requirements from a user; optimizing linearized said plurality of mathematical equations according to received said plurality of network model optimization requirements, thereby generating at least one optimized solution for linearized said plurality of mathematical equations; performing a local search starting from said at least one optimized linearized solution using said plurality of mathematical equations, thereby generating at least one optimized solution.

Optionally, said plurality of mathematical equations is a plurality of non-linear mathematical equations. Optionally, said linearizing is performed by a first order Taylor series. Optionally, said linearizing utilizes said at least one result set. Optionally, at least one of said receiving a network model, said simulating, said feeding, said linearizing, said receiving a plurality of network models, said optimizing and said performing a local search is iteratively repeated. Optionally, the method further comprises: receiving an objective function evaluating said network model; assessing said at least one optimized solution by said objective function; and assessing said at least one optimized solution by said objective function; wherein assessed said at least one optimized solution is bigger than assessed said at least one optimized linearized solution. Optionally, said objective function comprises said plurality of network model optimization requirements. Optionally, the local search is stopped before said at least one optimized solution is achieved.

According to an aspect of some embodiments of the present invention there is provided a computerized method for scalable management optimization of pressurized water distribution networks, comprising: a computer readable storage medium; first program instructions to receive a network model representing a pressurized water distribution physical network, said network model having a plurality of water flow variables; second program instructions to simulate said network model by applying a plurality of mathematical equations representing the behavior of said plurality of water flow variables, thereby generating at least one result set comprising at least one result value for each of said plurality of water flow variables; third program instructions to feed said at least one result set to said plurality of mathematical equations; fourth program instructions to linearize said plurality of mathematical equations; fifth program instructions to receive a plurality of network model optimization requirements from a user; sixth program instructions to optimize linearized said plurality of mathematical equations according to received said plurality of network model optimization requirements, thereby generating at least one optimized solution for linearized said plurality of mathematical equations; seventh program instructions to perform a local search starting from said at least one optimized solution using said plurality of mathematical equations, thereby generating at least one optimized solution; wherein said first, second, third, fourth, fifth, sixth and seventh program instructions are stored on said computer readable storage medium.

Optionally, the plurality of mathematical equations is a plurality of non-linear mathematical equations and said linearizing is performed by turning said plurality of non-linear equations into a plurality of linear equations using a first order Taylor series.

According to an aspect of some embodiments of the present invention there is provided a system for scalable management optimization of pressurized water distribution networks, comprising: a computerized processor; an input module which receives a network model representing a pressurized water distribution physical network, said network model having a plurality of water flow variables and receives a plurality of network model optimization requirements from a user; a simulation module which simulates, using said processor (this is a part of simulator—not sure that it should separated . . . ), said network model by applying a plurality of mathematical equations representing the behavior of said plurality of water flow variables, thereby generating at least one result set comprising at least one result value for each of said plurality of water flow variables and feeds said at least one result set to said plurality of mathematical equations; an mathematical optimization module which generates a linearized mathematical programming (MILP) model said plurality of mathematical equations and optimizes linearized said plurality of mathematical equations according to received said plurality of network model optimization requirements, thereby generating at least one optimized solution for linearized said plurality of mathematical equations; a search module which performs a local search starting from said at least one optimized solution of linearized model using said plurality of mathematical equations, thereby generating at least one optimized solution.

Optionally, the plurality of mathematical equations is a plurality of non-linear mathematical equations and said linearizing is performed by turning said plurality of non-linear equations into a plurality of linear equations using a first order Taylor series.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 4 is an illustration of results of a comparison between methods for scalable management optimization of pressurized water distribution networks, according to some embodiments of the present invention.

DETAILED DESCRIPTION

Figure 1:
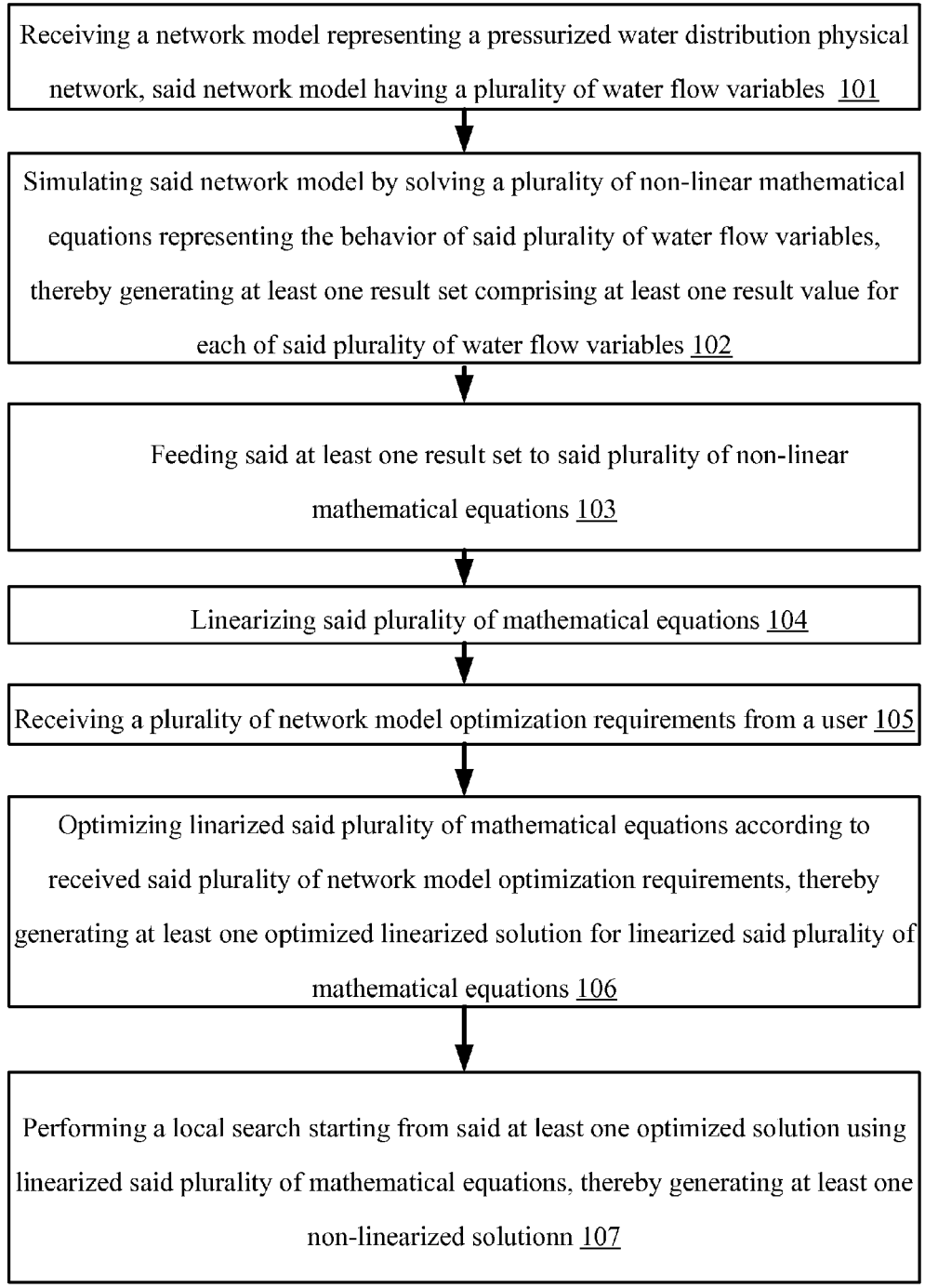
FIG. 1 is an illustration of a computerized method for scalable management optimization of pressurized water distribution networks, according to some embodiments of the present invention.

The present invention, in some embodiments thereof, relates to methods and systems for managing networks and, more specifically, but not exclusively, to methods and systems for solutions linearization for optimized management of a liquid distribution networks such as a pressurized water distribution network.

Pressurized water distribution models and other liquid distribution network models form complex and large networks. Methods for determining the desired state of network components, such as valves' settings are required to be obtained in short times: within the order of minuets and/or seconds to be applicable to real systems. The requirements for desired states of network components typically call for optimization procedures to be applied. Optimization of complex large networks is not obtained within the time constraints mentioned above. Methods and systems which optimize complex large networks within the order of minuets and/or seconds are desired. According to some embodiments of this invention, methods and system for obtaining near optimal solution(s) for pressurized water distribution networks are provided. The solutions are obtained by simulation of a network model, linearizing the network model by first order Taylor series, optimization of the linearized model using MILP solver (e.g., International Business Machines (IBM) ILOG CPLEX), and a local search heuristic around the optimization result applied to the non linear original network model. During the simulation, non-linear equations are solved. The solution defines a set of values for these equations used to describe the network model. The hydraulic simulator solves hydraulic non-linear equations of the water network and obtains hydraulic data such as flows, pressures tanks fill levels etc. The linearization is performed around the hydraulic data (such as flows) and/or a portion thereof. For example, the hydraulic data and/or a portion thereof are substituted in non-linear equations describing the behavior of the network model by the first order a truncated series expansion, such as Taylor series. The linear equations are then optimized using commercially available optimization tools. The optimization result then functions as a starting point for a local search heuristic. The local search heuristic is performed using hydraulic simulator in the loop which uses the original, e.g. non-linear equations.

Reducing a non-linear problem into a linear problem by linearization enables usage of more efficient optimization tools such as CPLEX. In addition, such combination scales to large networks. Running times are predictable and set according to client's requirements.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 illustrating a computerized method 100 for scalable management optimization of pressurized water distribution networks, according to some embodiments of the present invention. First, a network model is received 101. The network model may represent as a network of fluids. A pressurized water distribution network model is hereby used by way of example. The water distribution network model has a plurality of elements, such as pipes, water tanks, valves, pumps etc. A network may have 1-10 elements, 11-20 elements, 21-50 elements, 50-100 elements, 101-1000 elements, 1-100 elements, 1-1000 elements, 1001-5000 elements, 1001-10,000 elements, over 1000 elements, over 5000 elements and/or over 10,000 elements. For example, a network of 1001-5000 elements may have 10 valves, 1000 pipes, 305 junctions, 5 tanks and 3 reservoirs. Each element has a plurality of variables describing its physical properties. For example, a pipe is described by its length, material, diameter etc. The equations describing the behavior of the network model comply with laws and/or constraints such as energy conservation laws, mass conservation laws and the like. For example, in a pressurized water network model the amount of water which flows into each network junction is equal to the amount of water flowing from that junction plus the amount of water consumed in that junction. The laws and/or constraints are be described by a set of non-linear algebraic equations. Next, a set of values is obtained for the network model according to these requirements using a simulator 102. For example, a pressurized water network model is simulation with a simulator such as the water distribution system modeling software from the environmental protection agency NET (EPANET) and/or the WaterGEMS. The simulator generates at least one result value for each of said plurality of variables. The simulation generates a solution(s) which are a set of values: one value for each of the network model variables according to the above described laws and/or constraints. For example, a solution comprises the state of each valve of the network model and the flow in each pipe of the network model (per each time). Such a set of values complies with energy conservation law for each intersection in the network model and other physics laws described by non-linear equations utilized by the simulator. One exemplary solution produced by a simulator is a set of values representing amount of water flow in each pipe of a pressurized water network model. Another exemplary solution is a set of values representing pressure in each pipe of a water network model. Optionally, the simulator is a commercially available simulator for solving network models, such as EPANET and/or WaterGEMS. Optionally, the simulator is a commercially available specialized simulator for solving pressurized water network models. Next, the simulation result values are fed into the non-linear equations describing said network model 103. The non-linear equations are an algebraic description of the pressurized water network model. Such as algebraic descriptions aim to capture the physics, components and connectivity among other model features. Next, the non-linear algebraic equations, used to describe the laws and/or constraints, are linearized 104. As used herein the terms linearization refer to a mathematical method for finding the linear approximation to a function at a given point. Linearized equations are a result of such mathematical approximation. The linearization may be performed by a first order Taylor series. The linearization is performed using the simulator's solution. Next, optimization requirements are received 105. The requirements are received from a user. The user may be a person and/or another system. Exemplary requirements for a pressurized water network model are minimum pressure, maximum pressure and target pressure during the day for a set of specific water consumption points called critical points. Exemplary requirements for a pressurized water network model are minimization of overall pressure in all junctions for all times when the minimum pressure is lower bounded. Next, the linearized equations from the previous steps are optimized 106. The optimization uses an objective function. The objective function comprises the received requirements described above. The objective function may further comprise other requirements, laws and/or constraints. The objective function may contain the linearized equations describing compliance with physical laws. The objective function, as well as other elements related to the optimization problem, may be described using widely available optimization languages such as Optimization Programming Language (OPL), Algebraic Modeling Programming Language (AMPL) for linear and non-linear optimization problems etc. The optimization is performed under constraints. In addition to maximizing the objective function value constraints over variables of the model network are required to be met. Mathematical programming is used to optimize the objective function given constraints over at least one of the objective function variables. The optimization may be performed by one of the available mathematical programming solvers, e.g., IBM ILOG CPLEX, Coin- or linear programming (CLP) etc. The optimization step may provide a single solution and/or a set of solutions. In case of a solution set solution choice criteria may be applied. Exemplary choice criteria are minimum distance from network model current state (such as, for example, valves' settings), thereby requiring minimal changes to adjust a network according to the chosen solution. The problem solved by the solvers is MILP (mixed-integer linear programming) Optionally, mixed-integer linear programming is used for the optimization. Finally, a local search heuristic is performed with the original (i.e. non-linearized) network model described by non-linear equations 107. The optimized solution from the previous stage is fed as a starting point for the local search heuristic. The search is guided by an objective function comprising the received user requirements. Optionally, local search heuristic(s) filter out decision variables with minor immediate influence on an objective function. Optionally, the local search heuristic iteratively improves the objective function by exhaustively going over the shortlisted search space, while gradually decreasing the search range, on the remaining decision variables and assessing each iteration solution at the simulator. Optionally, the simulation, linearization and optimization are iterated thereby creating an improvement loop. Optionally, the optimization and local search heuristic are iterated thereby creating an improvement loop. Optionally, the simulation, global optimization and local search are iterated.

Figure 2:
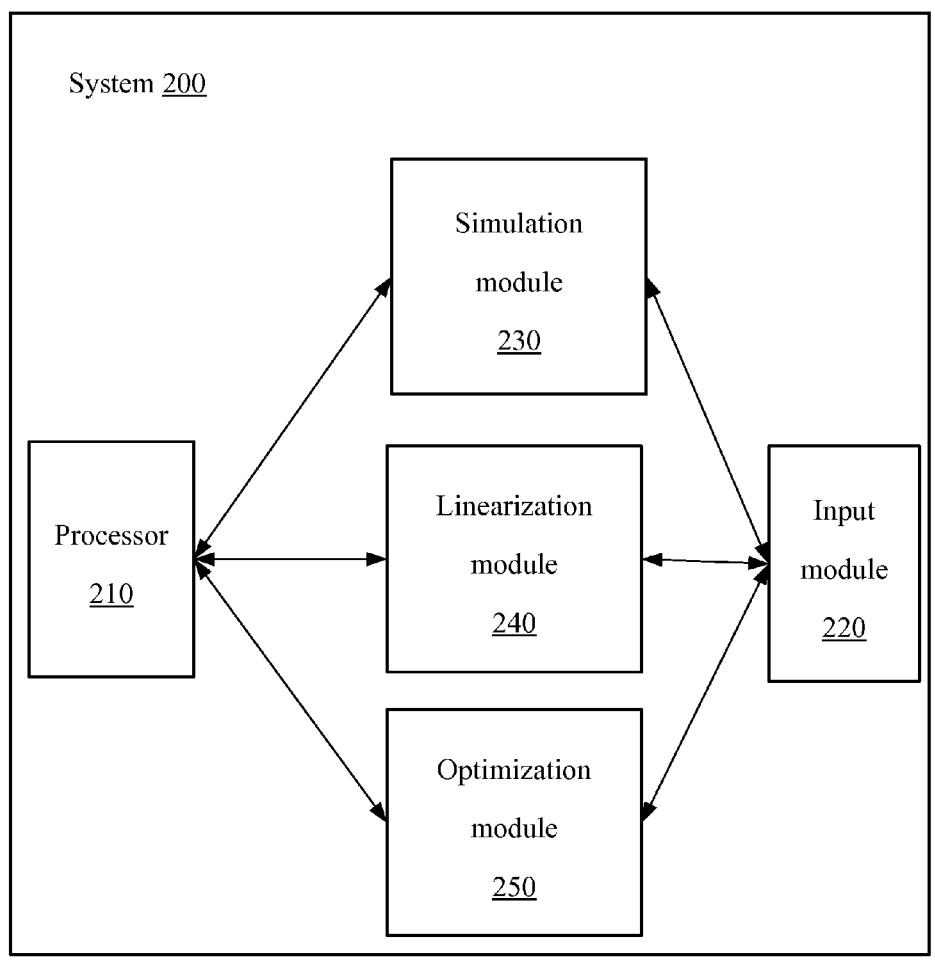
FIG. 2 is an illustration of a system for scalable management optimization of network models, according to some embodiments of the present invention.

Reference is now made to FIG. 2 illustrating a system 200 for scalable management optimization of network models, according to some embodiments of the present invention. The connectivity of a network model may be represented by a graph comprised of edges representing pipes and vertices representing junctions. The network model may represent a physical network such as a pressurized water distribution network. The system 200 comprises five components: a computerized processor 210, an input module 220, a simulation module 230, a mathematical optimization linearized module 240 and a local search heuristic module 250. The input module 220 interacts with the simulation module 230, the mathematical optimization module 240 and the local search heuristic module 250. The input module 220 receives a network model representing a network model in a format specified by a hydraulic simulator. The input module 220 further receives network model optimization requirements from a user. The user may be a person using the system 200 and/or may be second system interacting with the current system 200. The reception of the network model and the reception of the network model optimization requirements may be performed at different times and/or in time proximity. The simulation module 230 performs a simulation using the processor 210. The simulation of the network model is performed using non-linear mathematical equations describing the behavior of the network model's vertices' properties and/or edges' properties. For example, the non-linear mathematical equations may represent the behavior of a liquid flow variables and/or water flow variables. The simulation generates at least one result set. The result set comprises at least one result value for each of network model variables. For example, in a water network the result set may include the amount of water flowing in each pipe of that network at each simulated time. Another example includes the water pressure value in each junction. The result set is transferred from the simulation module 230 to the mathematical optimization linearized module 240 by the simulation module 230, the linearization module 240 and/or the input module 220. The linearization module 240 linearized the mathematical equations. The linearization is performed by the linearization module 240 using the result set obtained from the simulation module. The linearization module 240 further optimizes the linearized model. The optimization is performed according to an objective function. The network model optimization requirements are at least some of the components of that objective function. The linearization module generates at least one optimized solution for the linearized mathematical model. This solution is a guaranteed (global) optimal solution, but refers to a linearized mathematical programmed model (optionally, the optimization can stopped within near optimum solution). The search module 250 performs a local search optimization. The local search starts from the end point provided by the mathematical optimization module. The local region of the mathematical optimization solution in a solutions space is searched to generate one or more solution(s).

Figure 3:
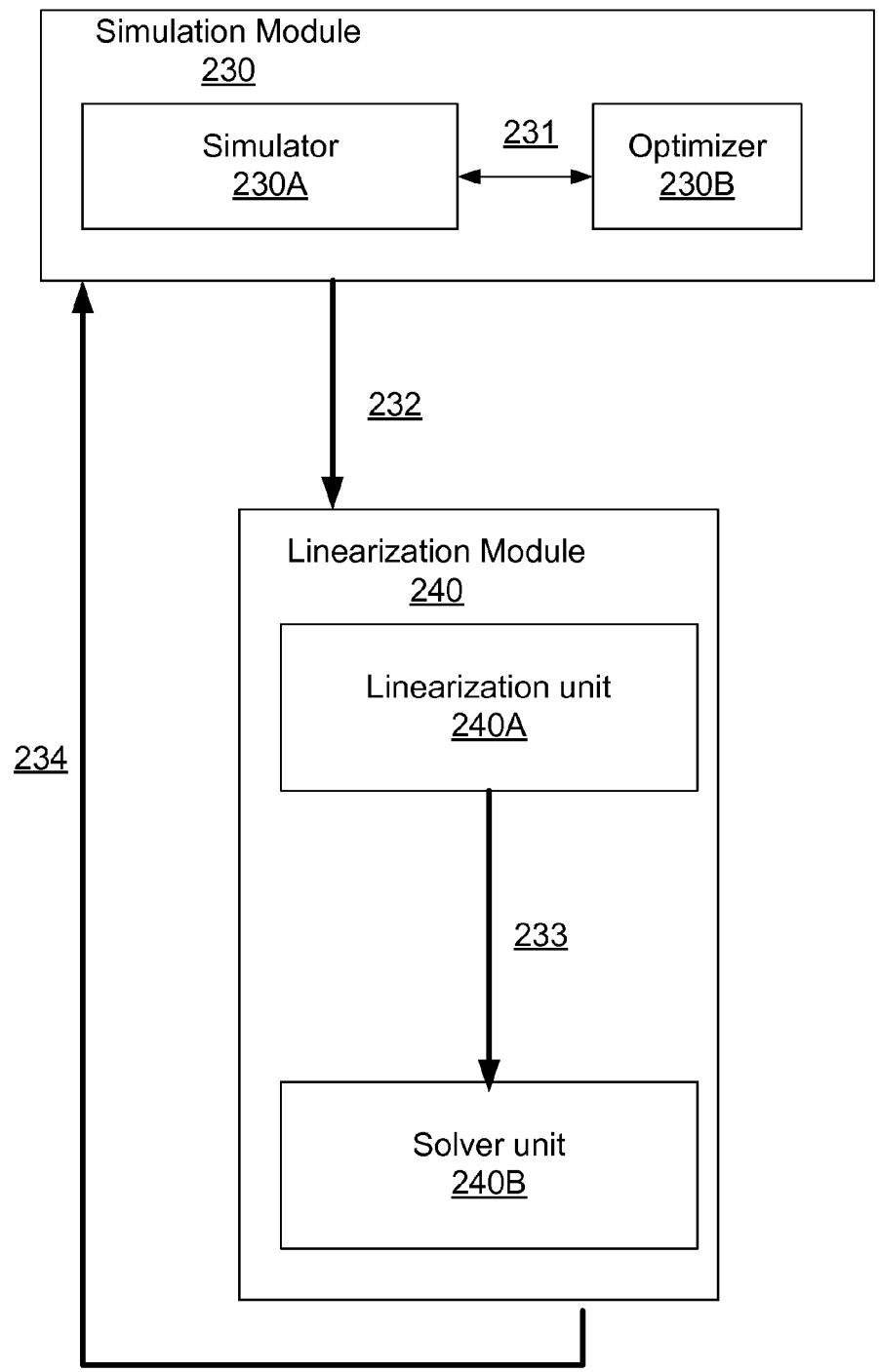
FIG. 3 is an illustration of a flow between the modules and units of a system for scalable management optimization of network models, according to some embodiments of the present invention.

Reference is now made to FIG. 3 illustrating a flow between the modules and units of a system for scalable management optimization of network models, according to some embodiments of the present invention. The simulator module 230 and the mathematical optimization module 240 are as described in FIG. 2. The simulator module 230 may comprise two internal sub-modules: a simulator 230A and an optimizer 230B. The mathematical optimization module 240 may comprise two internal sub-modules: an MILP model unit 240A and a solver unit 240B. The results of the linearization module 240 may be fed back into the simulator 230 iteratively 234. This process may be used to improve the network model according to some objective function as described in FIGS. 1, 2 and 4.

Reference is now made to FIG. 4 illustrating results of a comparison between methods for scalable management optimization of pressurized water distribution networks, according to some embodiments of the present invention. The comparison table 400 illustrates the ability of methods and systems of the current inventions to maintain the same quality level of a solution for a network model according to user's optimization requirements while maintaining short running times for complex large network models. The table 400 lists 5 networks: SB25 (411, 412), a customer network named Net 1 413, ExNet network 414 and a network obtained from the Water District customer referred to as Net2 415. The physical size of each pressurized water network model is described in columns 420, 430, and 440 showing the number of pipes, valves and covered time respectively (421-425, 431-435, 441-445). The presented optimization is performed by two methods: by Non Linear Programming (NLP) method (Eck, B., Mevissen M., "Valve Placement in Water Networks: Mixed-Integer Non-Linear Optimization with Quadratic Pipe Friction", IBM Research Report) and using Linear approximation (one embodiment of the present invention). Columns 450 and 460 show the respective computation times (451-455 and 461-465). Columns 470 and 480 show the respective values of the objective functions (471-474 and 481-485). The advantage of the linear approach is demonstrated clearly with the longer run of 24 hours 442 of SB25 network model 412: The linear running time was 15 seconds 462 compared to 78 seconds with NLP 452, while the objective function results were the same 472 and 482. The linearization reduced running time while obtaining similar quality of results as judged by the objective function estimating the suggested network model.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. It is expected that during the life of a patent maturing from this application many relevant simulation, linearization, approximation and/or optimization techniques will be developed and the scope of the terms simulation, linearization, approximation and/or optimization are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method for management optimization of pressurized liquid distribution networks performed by a processor, comprising:

receiving via a input interface in communication with said processor, a network model representing a real physical pressurized liquid distribution network comprising a plurality of network elements including pipes, tanks, valves, and pumps, said network model having a plurality of liquid flow variables and a plurality of variables describing physical properties of each of said network elements;

performing as part of a global optimization phase:

simulating, by said processor, said network model by solving a plurality of non-linear mathematical equations representing the behavior of said plurality of liquid flow variables, thereby generating at least one result set comprising at least one result value for each of said plurality of liquid flow variables;

feeding said at least one result set to said plurality of non-linear mathematical equations;

linearizing, by said processor, said plurality of non-linear mathematical equations;

receiving, via said input interface, a plurality of network model optimization requirements from a user;

optimizing, by said processor, linearized said plurality of mathematical equations according to received said plurality of network model optimization requirements, thereby generating at least one global optimized solution for linearized said plurality of mathematical equations;

performing as part of a local search phase:

performing, by said processor, a local search starting from said at least one global optimized solution using a simulator simulating said network model by solving said plurality of non-linear mathematical equations representing the behavior of said plurality of liquid flow variables, thereby generating at least one locally improved solution;

wherein said at least one locally improved solution includes desired states of said network elements of said real physical pressurized liquid distribution network.

2. The method of claim 1, wherein said linearizing said plurality of linear equations is performed by a first order Taylor series.

3. The method of claim 1, wherein said linearizing said plurality of non-linear mathematical equations utilizes said at least one result set.

4. The method of claim 1, wherein at least one of said receiving a network model, said simulating, said feeding, said linearizing, said receiving a plurality of network models, said optimizing and said performing a local search is iteratively repeated.

5. The method of claim 1, further comprising:

receiving an objective function evaluating said network model;

assessing said at least one optimized solution by said objective function; and assessing said at least one optimized locally improved solution by said objective function;

wherein assessed said at least one optimized solution is bigger than assessed said at least one optimized solution.

6. The method of claim 5, wherein said objective function comprises said plurality of network model optimization requirements.

7. The method of claim 1, wherein said local search is stopped before said at least one optimized solution is achieved.

8. The method of claim 1, wherein said pressurized liquid distribution physical network is a pressurized water distribution physical network and said plurality of liquid flow variables is a plurality of water flow variables.

9. The method of claim 1, wherein said at least one locally improved solution satisfies said plurality of non-linear mathematical equations.

10. The method of claim 1, wherein received said plurality of network model optimization requirements comprises at least one of:
a minimization of overall pressure in a plurality of junctions of said network model; a lower bound pressure in a plurality of pipes of said network model.

11. A computerized method for management optimization of pressurized liquid distribution networks, comprising:
a non-transitory computer readable storage medium storing instructions for implementation by a processor;
first program instructions to receive via a input interface a network model representing a real world pressurized liquid distribution network comprising a plurality of network elements including pipes, tanks, valves, and pumps, said network model having a plurality of liquid flow variables and a plurality of variables describing physical properties of each of said network elements;
performing as part of a global optimization phase:
second program instructions to simulate said network model by applying a plurality of mathematical equations representing the behavior of said plurality of liquid flow variables, thereby generating at least one result set comprising at least one result value for each of said plurality of liquid flow variables;
third program instructions to feed said at least one result set to said plurality of mathematical equations;
fourth program instructions to linearize said plurality of mathematical equations;
fifth program instructions to receive via said input interface a plurality of network model optimization requirements from a user;
sixth program instructions to optimize linearized said plurality of mathematical equations according to received said plurality of network model optimization requirements, thereby generating at least one global optimized solution for linearized said plurality of mathematical equations;
performing as part of a local search phase:
seventh program instructions to perform a local search starting from said at least one global optimized solution, using a simulator simulating said network model by solving said plurality of non-linear mathematical equations representing the behavior of said plurality of liquid flow variables, thereby generating at least one locally improved solution;
wherein said at least one locally improved solution includes desired states of said network elements of said real physical pressurized liquid distribution network;
wherein said first, second, third, fourth, fifth, sixth and seventh program instructions are stored on said non-transitory computer readable storage medium.

12. The method of claim 11, wherein said plurality of mathematical equations is a plurality of non-linear mathematical equations and said linearizing is performed by turning said plurality of non-linear equations into a plurality of linear equations and solving said plurality of linear equations by a first order Taylor series.

13. The method of claim 11, wherein said pressurized liquid distribution physical network is a pressurized water distribution physical network and said plurality of liquid flow variables is a plurality of water flow variables.

14. The method of claim 11, wherein said at least one locally improved solution satisfies said plurality of non-linear mathematical equations.

15. The method of claim 11, wherein received said plurality of network model optimization requirements comprises at least one of:
a minimization of overall pressure in a plurality of junctions of said network model; a lower bound pressure in a plurality of pipes of said network model.

16. A system for management optimization of pressurized liquid distribution networks, comprising:
a computerized processor;
an input interface in communication with said computerized processor; and
a non-transitory computer readable storage medium storing instructions for implementation by a processor, comprising:
an input module which includes instructions to receive via said input interface a network model representing a real physical pressurized liquid distribution network comprising a plurality of network elements including pipes, tanks, valves, and pumps, said network model having a plurality of liquid flow variables and a plurality of variables describing physical properties of each of said network elements, and receives a plurality of network model optimization requirements from a user;
a simulation module which includes instructions to simulate as part of a global optimization phase, using said network model by applying a plurality of mathematical equations representing the behavior of said plurality of liquid flow variables, thereby generating at least one result set comprising at least one result value for each of said plurality of liquid flow variables and feeds said at least one result set to said plurality of mathematical equations;
an optimization module which includes instructions to generate as part of the global optimization phase a linearized mathematical programming model using said plurality of mathematical equations and optimizes linearized said plurality of mathematical equations according to received said plurality of network model optimization requirements, thereby generating at least one global optimized solution for linearized said plurality of mathematical equations;
a search module which includes instructions to perform as part of a local search phase a local search starting from said at least one global optimized solution using a simulator simulating said network model by solving said plurality of non-linear mathematical equations representing the behavior of said plurality of liquid flow variables, thereby generating at least one locally improved solution;
wherein said at least one locally improved solution includes desired states of said network elements of said real physical pressurized liquid distribution network.

17. The system of claim 16, wherein said plurality of mathematical equations is a plurality of non-linear mathematical equations and said linearizing is performed by turning said plurality of non-linear equations into a plurality of linear equations using first order Taylor series.

18. The system of claim 16, wherein said pressurized liquid distribution physical network is a pressurized water distribution physical network and said plurality of liquid flow variables is a plurality of water flow variables.

19. The system of claim 16, wherein said at least one locally improved solution satisfies said plurality of non-linear mathematical equations.

20. The system of claim 16, wherein received said plurality of network model optimization requirements comprises at least one of:
   a minimization of overall pressure in a plurality of junctions of said network model; a lower bound pressure in a plurality of pipes of said network model.

* * * * *